US010424914B2

(12) United States Patent
Bürkert et al.

(10) Patent No.: US 10,424,914 B2
(45) Date of Patent: Sep. 24, 2019

(54) OVERTEMPERATURE PROTECTION

(71) Applicant: ebm-papst Mulfingen GmbH & Co. KG, Mulfingen (DE)

(72) Inventors: Martin Bürkert, Dörzbach-Hohebach (DE); Steffen Kammleiter, Assamstadt (DE); Günter Haas, Mulfingen (DE); Daniel König, Gerabronn (DE)

(73) Assignee: ebm-papst Mulfingen GmbH & Co. KG, Mulfingen (DE)

(*) Notice: Subject to any disclaimer, the term of this patent is extended or adjusted under 35 U.S.C. 154(b) by 0 days.

(21) Appl. No.: 15/577,808

(22) PCT Filed: May 30, 2016

(86) PCT No.: PCT/EP2016/062195
§ 371 (c)(1),
(2) Date: Nov. 29, 2017

(87) PCT Pub. No.: WO2016/193228
PCT Pub. Date: Dec. 8, 2016

(65) Prior Publication Data
US 2018/0159312 A1    Jun. 7, 2018

(30) Foreign Application Priority Data
Jun. 1, 2015 (DE) .................... 10 2015 108 587

(51) Int. Cl.
*H02P 23/00* (2016.01)
*H02H 7/085* (2006.01)
(Continued)

(52) U.S. Cl.
CPC ....... *H02H 7/0852* (2013.01); *H02P 29/0241* (2016.02); *H02H 1/0038* (2013.01); *H02H 3/05* (2013.01)

(58) Field of Classification Search
CPC ..... H02H 3/05; H02H 7/0852; H02P 29/0241
See application file for complete search history.

(56) References Cited

U.S. PATENT DOCUMENTS 5,784,232 A *   7/1998  Farr ................. F25B 49/025
                                                361/103
2003/0128006 A1* 7/2003  Klaus ................. H02H 1/0007
                                                318/473
(Continued)

FOREIGN PATENT DOCUMENTS

CN    102832858 A    12/2012
DE       2635552 A1    2/1978
(Continued)

OTHER PUBLICATIONS

International Search Report (in German with English Translation) for PCT/EP2016/062195, dated Aug. 22, 2016; ISA/EP.
(Continued)

Primary Examiner — Muhammad S Islam
(74) Attorney, Agent, or Firm — Harness, Dickey & Pierce, P.L.C.

(57) ABSTRACT

A protective circuit protects against overheating of the stator windings of an EC motor. The stator windings are connected to a semiconductor output stage which is designed for time-offset control of the stator windings using a driver circuit of a commutation controller. The protective circuit has two redundant sensor circuits, wherein two resistance-dependent sensor elements connected in series are provided in the first sensor circuit and one resistance-dependent sensor element is provided in the second sensor circuit. The first and the second sensor circuits are connected, respectively, to two evaluating circuits separated from each other and cause an interruption of the driver circuit using switch-off means when a system-specific resistance value of the first (Continued)

Figure 1:
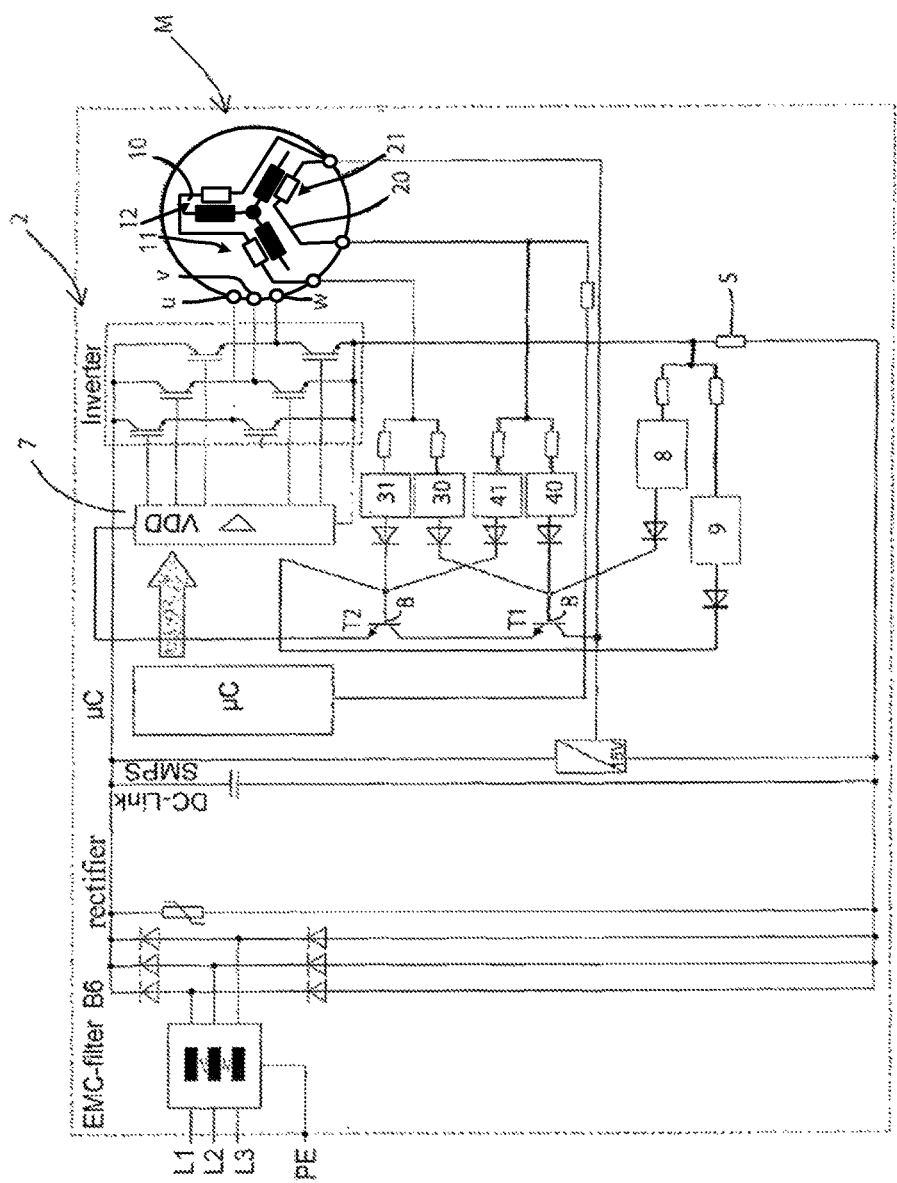

sensor element or the one sensor element associated with the second sensor circuit is reached.

11 Claims, 3 Drawing Sheets

(51) Int. Cl.
  *H02P 29/024* (2016.01)
  *H02H 1/00* (2006.01)
  *H02H 3/05* (2006.01)

(56) References Cited

U.S. PATENT DOCUMENTS

| | | | |
|---|---|---|---|
| 2006/0131968 A1 | 6/2006 | Groening et al. | |
| 2007/0024225 A1* | 2/2007 | Hahn | H02P 6/12 318/434 |
| 2010/0039736 A1* | 2/2010 | Spindler | H02H 7/0852 361/24 |
| 2012/0319632 A1* | 12/2012 | Lipp | H02H 7/0844 318/400.21 |
| 2014/0333245 A1* | 11/2014 | Kammleiter | H02P 29/024 318/400.22 |
| 2016/0013742 A1* | 1/2016 | Gohara | H02H 7/085 318/461 |

FOREIGN PATENT DOCUMENTS

| | | |
|---|---|---|
| EP | 2184830 A1 | 5/2010 |
| EP | 2535993 A1 | 12/2012 |
| WO | WO-2004045049 A1 | 5/2004 |

OTHER PUBLICATIONS

Office Action dated Sep. 5, 2018 in corresponding CN application 201680028860.3.

* cited by examiner

OVERTEMPERATURE PROTECTION

CROSS REFERENCE TO RELATED APPLICATIONS

This application is a U.S. National Phase Application under 35 U.S.C. 371 of International Application No. PCT/EP2016/062195 filed on May 30, 2016 and published in German as WO 2016/193228 A1 on Dec. 8, 2016. This application claims priority to German Application No. 10 2015 108 587.9 filed on Jun. 1, 2015. The entire disclosures of all of the above applications are incorporated herein by reference.

FIELD

The disclosure relates to a protective circuit for protecting a device, especially an electric motor, against heat overload.

BACKGROUND

It is known from the prior art it is known how to use for protection against motor heat overload, in addition to an overload relay which recognizes an overloading of the motor with the aid of the motor's current uptake, also thermistor protective circuits, for example, which detect and evaluate the temperature of a motor winding. Various temperature detector elements are used for detecting the temperature of the motor winding, such as temperature sensors, especially PTC (PTC: positive temperature coefficient) thermistors, PT1OO sensors and KTY sensors (with PTC characteristic), whose electrical resistance changes in dependence on the detected temperature. The mode of operation of the over-temperature protection from the solutions known in the prior art with a PTC sensor is based on the principle that two temperature-dependent resistance regions are used. The resistance of such a temperature detector element lies in a first resistance region for as long as the motor winding is in a temperature range which presents no problems. The second resistance region, whose resistance values are for example larger than those of the first resistance region, then corresponds to a temperature above a system-specific threshold value.

Furthermore, so-called thermo-click elements, also known as temperature monitors, can also be used as temperature detector elements. These generally constitute simple switches, usually formed by means of a bimetal, which is closed in the first temperature region and which opens in a second temperature region, i.e., above the temperature threshold value. That is, the resistance changes from almost 0Ω to infinite resistance.

In the first mentioned temperature detector elements, the temperature sensors, the overloading of the motor is assessed by the resistance change in the temperature detector elements within predefined value ranges. On the other hand, the thermo-click element in its customary area of application cuts out the current through a motor winding upon reaching the temperature threshold value. Temperature sensors, on the contrary, are assessed by means of a protective circuit, which basically determines the electrical resistance of the particular temperature detector elements, and puts out a message signal to a switch, an evaluation circuit, or the like, thereby triggering e.g. a shut-off of the device or starting some other predetermined function if a thermal overload is recognized depending on the measured temperature. At rather large winding currents, the sensor element or the temperature monitor does not directly switch the winding current, but instead acts on the power supply or the actuating of the power end stage.

From EP 2535993 A1 there is known an actuating circuit for an electronically commutated, collector-less d.c. motor, i.e., a so-called EC motor with a semiconductor end stage at a d.c. power supply potential, which is actuated by an electronic commutation control system across a driver stage for the time-offset actuation of stator windings of the motor in order to generate a rotating magnetic field for a rotor in dependence on the rotor's rotary position.

Such EC motors, in keeping with the present national and international standards, need to be protected against overheating in event of abnormal operating situations.

It is furthermore known how to design impedance-protected motors, i.e., how to dimension the winding resistance and the wire diameter so that no overheating can occur during abnormal operation. But a design with impedance protection is not possible for EC motors, especially those with single-tooth developments, because the winding resistances are very small.

Therefore, so far a software current limitation has been integrated in the commutation control system, which assigns a lower threshold value for the starting current and an upper threshold value for the operating current. If the lower threshold value is reached or surpassed in the starting phase, the motor will be switched off. But if the motor starts correctly, it switches to a monitoring of the operating current in regard to the upper threshold value, and if the upper threshold value is reached or surpassed the motor will be switched off.

However, such protective measures realized by software alone are not taken into consideration by many authorization entities, such as UL (Underwriters Laboratories), during the authorization testing for compliance with a valid UL standard in order to award the required approval.

Moreover, there are problems which need to be considered in practice on account of a rapid temperature rise. Thus, e.g., in the case of a rotor blockage of the motor, rapid rises in winding temperature may occur depending on the winding design. As a result, unacceptably high winding temperatures occur, but they do not bring about a timely shut-off of the winding current on account of the sluggish temperature monitors, whose response is too slow.

SUMMARY

Accordingly, the problem which the present disclosure proposes to solve is to create an actuation circuit of the above-described kind which assures an enhanced operating security for avoidance of motor overheating and in particular safely prevents damage due to the above-described dynamic short-term overload or overtemperature. Moreover, the problem which the present disclosure proposes to solve is to safely prevent the power section of the power electronics from being overloaded or damaged during a rotor blockage and in particular to ensure that the power switches of the power end stage are not excessively heavily (statically) loaded. This problem must be solved in the context of the motor control system fulfilling the relevant standards for electrical safety and overload protection.

According to the disclosure, therefore, a protective circuit is proposed for protecting against overheating of the stator windings (U, V, W) of an EC motor, which are connected preferably to a semiconductor output stage and which are designed for the time-offset control of the stator windings (U, V, W) of the EC motor by means of a driver circuit of an electronic commutation controller for the purpose of producing a rotating magnetic field, wherein the protective circuit is designed having two redundant sensor circuits, wherein two resistance-dependent sensor elements connected in series are provided in a first sensor circuit and one resistance-dependent sensor element is preferably provided in a second sensor circuit.

According to the disclosure, the first and the second sensor circuits are connected, respectively, to two evaluating circuits separated from each other, which bring about an interruption of the stator windings (U, V, W) of the motor from the power supply of the driver circuit preferably by means of switch-off means when a system-specific limit resistance value of the sensor element associated with the sensor circuit is reached.

Moreover, it is preferable to provide two current limiting circuits decoupled from each other in order to avoid too rapid motor heating, being designed to measure the current across a shunt resistor, and when a system-specific limit value is surpassed the evaluation circuits are switched off or the shut-off means of the evaluation circuit are actuated, and preferably at least one of the two evaluation circuits has shut-off means for interrupting the stator windings (U, V, W) of the motor from the power supply of the driver circuit.

Stated otherwise, this means that the motor thermal protection is assured by two circuits (sensor circuits) separate from each other, the first sensor circuit having preferably two series-connected PTCs with steep rise in resistance in the region of the shut-off temperature or alternatively two series-connected temperature monitors. The second sensor circuit comprises a PTC with approximately linear characteristic, which besides the overtemperature protection is also suitable for measuring the monitored winding directly or indirectly.

Preferably, all components of the two circuits are designed as approved standardized components.

The evaluation of the first sensor circuit is done by the two aforementioned evaluation circuits which are separated from each other and entirely decoupled. The triggering occurs at a hardware-determined limit resistance value, which in the case of a PTC lies in the region of the steeply rising resistance curve of the sensor characteristic and is distinctly associated with a defined temperature taking into account its tolerances (or a defined temperature range taking into account the tolerances). When using temperature monitors, a resistance value representative of an opened contact can likewise be defined, at which the downstream evaluation circuit responds.

The evaluation of the second PTC sensor circuit is likewise done by two evaluation circuits which are separated from each other and entirely decoupled. Here as well, the triggering occurs at a hardware-determined resistance value, which is defined via the sensor characteristic and is distinctly associated with a shut-off temperature with specified tolerances (or a temperature range taking into account the tolerances).

In one preferred embodiment of the disclosure, each time one of the two evaluation circuits of each sensor circuit is connected to a first shut-off transistor, by which the commutation shut-off can be accomplished. Moreover, preferably each time the other of the two evaluation circuits of each sensor circuit is connected to a second shut-off transistor, by which the commutation shut-off can be accomplished.

The two sensor circuits (switching circuits) act by their triggering circuits decoupled from each other on the two shut-off transistors, which interrupt the power supply of the driver circuit upon surpassing the established maximum temperature values of the winding.

In one modification of the disclosure it can furthermore be provided that, in order to avoid too fast motor heating (which might not be detected in good time by the motor thermal protection circuit) and to prevent high motor currents (which might result in failure of the power electronics), the end stage current is measured across a shunt resistor and evaluated by two current limiting circuits which are separated from each other and totally decoupled. If the hardware-dictated limit current values are surpassed, the evaluation circuits or shut-off means activatable by the evaluation circuits switch off the commutation and switch it on again only after a long dead time. The commutation shutoff here occurs preferably by interrupting the driver power supply via the shut-off transistors of the thermal protection circuit of the sensor circuits.

Due to the long dead time before switching on the driver circuit once more, the mean end stage or motor current remains at a noncritical level in terms of the load capacity of the end stage, especially in the case of a blocked rotor.

According to the disclosure, therefore, the above described protective circuit is modified such that two current limiting circuits decoupled from each other are furthermore provided in order to avoid too fast motor heating, being designed to measure the current across a shunt resistor, and when a system-specific limit value is surpassed there is an interruption of the stator windings (U, V, W) of the motor from the driver circuit's power supply. In one preferred embodiment of the protective circuit, one of the current limiting circuits is connected to the base (or the gate) of the first shut-off transistor in order to actuate it independently of the evaluation circuits.

It is furthermore advantageously provided that the current limiting circuit is connected either to the base (or the gate) of the second shut-off transistor, in order to actuate this shut-off transistor independently of the evaluation circuits. Alternatively, the second current limiting circuit can also be connected directly to the driver circuit, in order to shut off the driver stage of the driver circuit directly.

In a likewise preferred embodiment of the protective circuit, the resistance-dependent sensor elements may be provided in the first sensor circuit as PTC resistances or temperature monitors, preferably with steep resistance characteristic, and the resistance-dependent sensor element in the second sensor circuit may be a PTC resistance with a substantially linear resistance characteristic.

In one modification of the disclosure, for redundancy it may be provided that the intermediate circuit current is measured by means of a measurement circuit and is switched off upon surpassing a given threshold, and only switched back on after a long dead time. Due to the long dead time before switching on the driver circuit or the intermediate current circuit once more, the mean end stage or motor current remains at a noncritical level in terms of the load capacity of the end stage, especially in the case of a blocked rotor. This design of the protective circuit has the further advantage that, when a fault occurs in addition in the power end stage (e.g., the failure of a switch in the end stage), the winding current remains at values below the permissible rated motor current, so that an overheating of the winding is prevented.

Especially advantageous is a design in which the measurement circuit for measuring the intermediate circuit current of the intermediate circuit of the EC motor is connected to the gate of an IGBT transistor in order to block the control section, preferably the emitter to collector section of the IGBT transistor, upon surpassing a given current value.

A further aspect of the present disclosure concerns a method for protecting the stator windings (U, V, W) of an EC motor (M) against overheating by using a protective circuit as described above, wherein upon reaching a system-specific limit value of one of the sensor elements of the sensor circuits or upon surpassing a permissible intermediate circuit current, an interruption of the currents through the stator windings (U, V, W) of the motor (M) occurs, or a shut-off means immediately interrupts the intermediate circuit and switches it on again after a sufficiently long dead time.

Other advantageous modifications of the disclosure are characterized in the dependent claims or will be represented more closely below, together with the description of the preferred embodiment of the invention by means of the figures.

DRAWINGS

Figure 2:
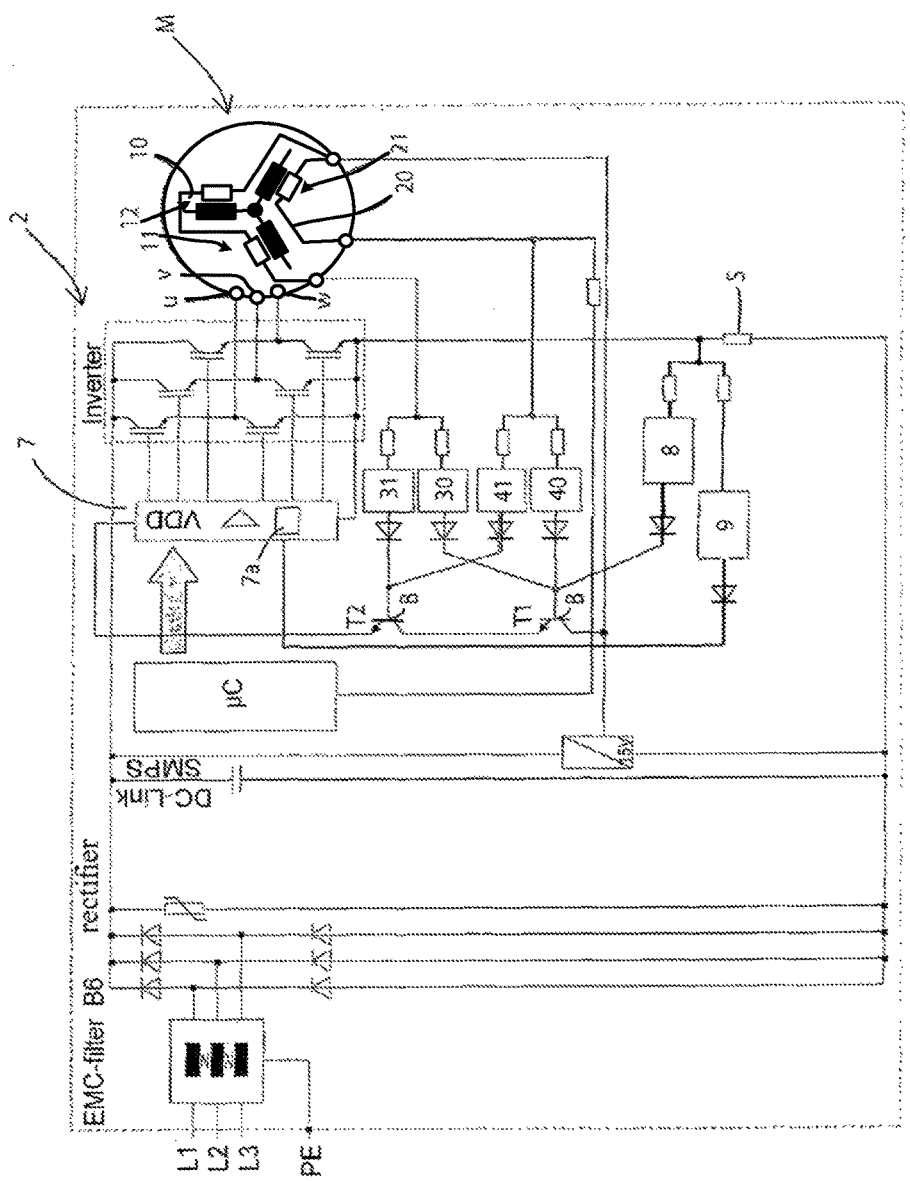
Figure 3:
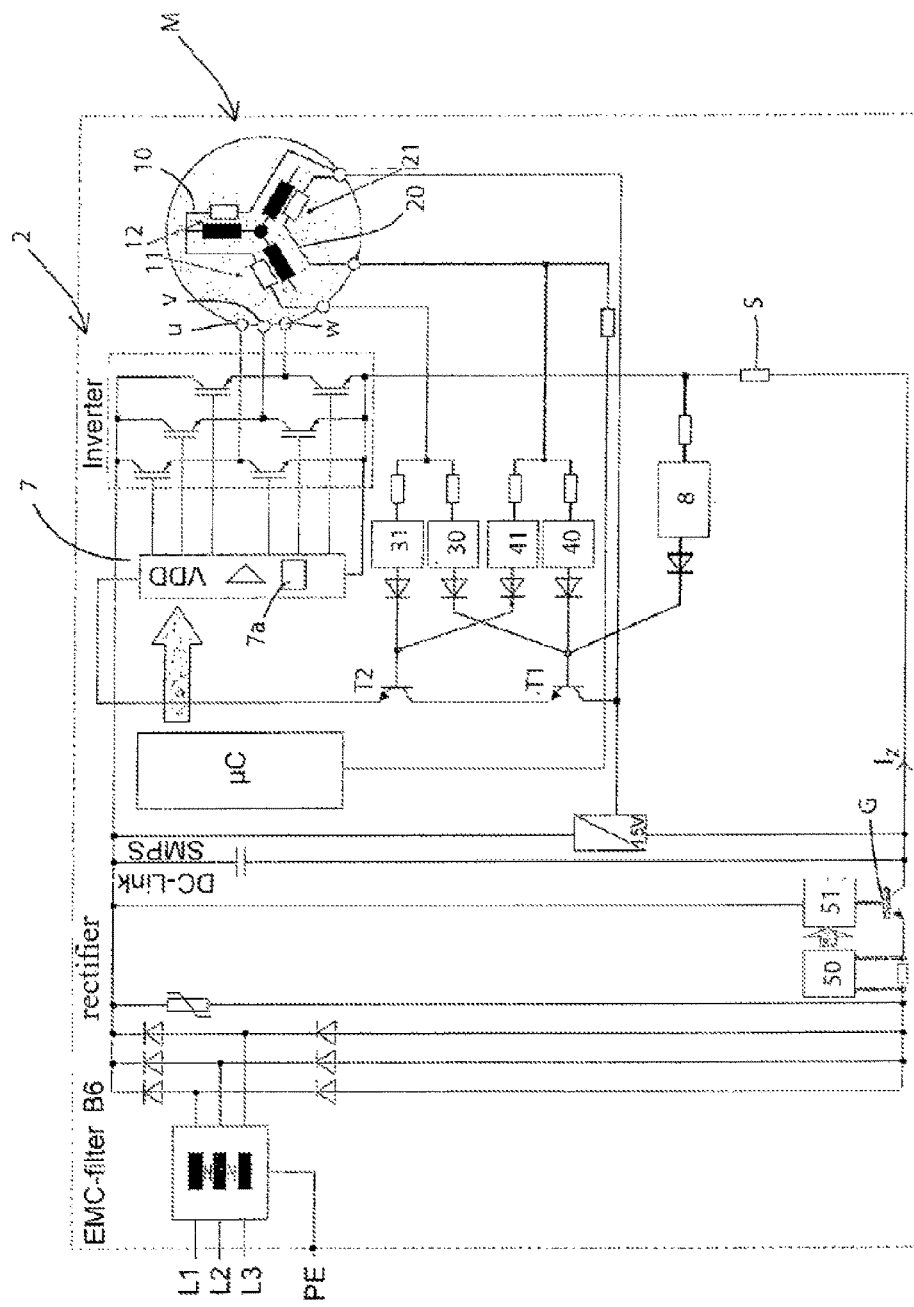

FIG. 1, a first embodiment of a protective circuit according to the invention;

FIG. 2, a second embodiment of a protective circuit according to the invention and FIG. 3, a third embodiment of a protective circuit according to the invention.

DESCRIPTION

FIGS. 1 to 3 show different embodiments of a protective circuit according to the disclosure, the same reference numbers indicating the same structural or functional features.

FIG. 1 shows a first embodiment of a protective circuit 1 according to the disclosure for protecting against overheating of the stator windings U, V, W of an EC motor M, which are connected to a semiconductor output stage 2 and which are designed for the time-offset control of the stator windings U, V, W of the motor M by means of a driver circuit 7 of an electronic commutation controller for the purpose of producing a rotating magnetic field.

The protective circuit 1 is designed with two redundant sensor circuits 10, 20. Two resistance-dependent sensor elements 11, 12, being PTC resistances, are connected in series and provided in the first sensor circuit 10. One resistance-dependent sensor element 21, being a PTC resistance with a substantially linear resistance characteristic, is likewise provided in the second sensor circuit 20. The resistance-dependent sensor elements 11, 12 in the first sensor circuit constitute PTC resistances with steep resistance characteristic. The two sensor circuits 10, 20 are connected, respectively, to two evaluating circuits 30, 31 and 40, 41 separated from each other, which bring about an interruption of the stator windings U, V, W of the motor M from the power supply of the driver circuit 7 by means of switch-off means when a system-specific limit resistance value of the respective sensor element 11, 12 or 21 associated with the sensor circuit 10 or 20 is reached.

As can be seen in FIG. 1, there are furthermore provided two current limiting circuits 8, 9 decoupled from each other in order to avoid too rapid motor heating, being designed to measure the current across a shunt resistor S, and when a system-specific limit value is surpassed the shut-off means T1 or T2 are actuated or switched off.

As can also be seen, the current limiting circuit 8 is connected to the base B (or the gate) of the shut-off transistor T1 in order to actuate the shut-off transistor T1 independently of the PTC resistances of the evaluation circuits.

Moreover, it is provided in this sample embodiment that the current limiting circuit 9 is connected to the base B or the gate of the shut-off transistor T2 in order to actuate the shut-off transistor T2 independently of the temperature evaluation of the PTC resistance 21 by the evaluation circuits 31, 41.

The evaluation circuits 30, 31, 40, 41 are connected respectively to shut-off means T1, T2 to interrupt the stator windings U, V, W of the motor M from the driver power supply of the driver circuit 7, namely, the two evaluation circuits 30, 40 are connected to the shut-off transistor T1, by which the commutation shut-off can be accomplished, and the evaluation circuits 31, 41 are connected to a shut-off transistor T2, by which the commutation shut-off can be accomplished.

FIG. 2 shows a second embodiment of a protective circuit 1 according to the disclosure which differs from the first embodiment in that the current limiting circuit 9 is not connected to the base B or the gate of the shut-off transistor T2, but rather directly to the driver circuit 7, in order to switch off the driver stage 7a directly.

FIG. 3 shows a third embodiment of a protective circuit according to the disclosure. This protective circuit 1 has no second current limiting circuit 9, but instead a measurement circuit 50 for measuring the intermediate circuit current Iz of the intermediate circuit of the EC motor M. The protective circuit 50 is connected to the gate G of an IGBT transistor 51 in order to block the emitter to collector section of the IGBT transistor 50 upon surpassing a given current value. This design has the additional benefit that, upon occurrence of a fault in the power end stage, the winding current is limited to values below the permissible rated motor current, which prevents an overheating of the winding.

As can be seen in FIGS. 1 to 3, the sensor circuits with the evaluation circuits 30, 31, 40, 41 and the current limiting circuits are rectified with the current limiting switches 8, 9 are rectified by diodes in the direction of current flow.

The disclosure is not limited in its embodiment to the above indicated preferred sample embodiments. Instead, a number of variants are conceivable which make use of the presented solution, even in fundamentally different configurations.

The invention claimed is:

1. A protective circuit for protecting against overheating of stator windings of an EC motor, the stator windings are connected to a semiconductor output stage which is designed for control of the stator windings of the EC motor by means of a driver circuit of an electronic commutation controller for the purpose of producing a rotating magnetic field, the protective circuit comprises:
   a first sensor circuit and a second sensor circuit,
      the first sensor circuit including:
         a first sensor element having a resistance that varies with temperature; and
         a second sensor element having a resistance that varies with temperature and that has a first end that is directly connected to a second end of the first sensor element such that the second sensor element is connected in series with the first sensor element; and
      the second sensor circuit including only one sensor element having a resistance that varies with temperature; and
      the first sensor circuit and the second sensor circuits are connected, respectively, to first and second evaluating circuits which are separated from each other and which bring about an interruption of the driver circuit by means for switch-off when the resistance of the first sensor element reaches a system-specific limit resistance value or the resistance of the one sensor element of the second sensor circuit reaches the system-specific limit resistance value, in order to thereby switch the stator windings of the motor to a currentless state.

2. The protective circuit as claimed in claim 1, wherein two current limiting circuits decoupled from each other in order to avoid too rapid of a motor heating are provided, the two current limiting circuits being designed to measure a current across a shunt resistor, and when a system-specific limit value is surpassed, a power supply of the driver circuit is interrupted by means for shut-off, in order to thereby switch the stator windings of the motor to the currentless state.

3. The protective circuit as claimed in claim 2, wherein at least one of the first and second evaluation circuits has the means for shut-off to interrupt the power supply of the driver circuit, in order to thereby switch the stator windings of the motor to the currentless state.

4. The protective circuit as claimed in claim 1, wherein the first and second evaluation circuits are connected to a first shut-off transistor.

5. The protective circuit as claimed in claim 4, wherein the first and second evaluation circuits are connected to a second shut-off transistor.

6. The protective circuit as claimed in claim 5, wherein a current limiting circuit is connected to a base of the first shut-off transistor in order to actuate the shut-off transistor independently of the first and second evaluation circuits.

7. The protective circuit as claimed in claim 5, wherein a current limiting circuit is either connected to a base of the second shut-off transistor in order to actuate the shut-off transistor independently of the evaluation circuits or directly to the driver circuit in order to switch off a driver stage directly.

8. The protective circuit as claimed in claim 1, wherein the first and second sensor elements in the first sensor circuit are PTC resistances or temperature monitors, preferably with a steep resistance characteristic.

9. The protective circuit as claimed in claim 1, wherein the one sensor element in the second sensor circuit is a PTC resistance with a substantially linear resistance characteristic.

10. The protective circuit as claimed in claim 1, wherein a measurement circuit is provided for measuring an intermediate circuit current of an intermediate circuit of the EC motor, which is preferably connected to a gate of an IGBT transistor in order to block a control section, preferably an emitter to a collector section of the IGBT transistor, upon surpassing a given current value.

11. A method for protecting stator windings of an EC motor against overheating by using a protective circuit as claimed in claim 1, wherein upon reaching a system-specific limit value of one of the first and second sensor elements or upon surpassing a permissible intermediate circuit current, an interruption of a power supply of the stator windings of the EC motor occurs, or a means for shut-off interrupts or switches off an intermediate circuit.

* * * * *